United States Patent [19]

Heitmann

[11] Patent Number: 5,159,612

[45] Date of Patent: Oct. 27, 1992

[54] PULSE CODE MODULATION SYSTEM

[75] Inventor: Jürgen Heitmann, Alsbach-Hähnlein, Fed. Rep. of Germany

[73] Assignee: Robert Bosch GmbH, Darmstadt, Fed. Rep. of Germany

[21] Appl. No.: 301,823

[22] Filed: Jan. 25, 1989

Related U.S. Application Data

[63] Continuation-in-part of Ser. No. 532,443, Sep. 14, 1983, abandoned.

[30] Foreign Application Priority Data

Sep. 14, 1982 [DE] Fed. Rep. of Germany ......... 323956

[51] Int. Cl.$^5$ ............................................. H03K 5/156
[52] U.S. Cl. ....................... 375/34; 341/50; 358/141; 375/58
[58] Field of Search ........................ 341/50, 55, 58, 63, 341/96, 102, 103, 106; 375/25, 26, 34, 58; 178/2 R, 28; 358/13, 138, 141; 360/32

[56] References Cited

U.S. PATENT DOCUMENTS

| | | | |
|---|---|---|---|
| 3,678,389 | 7/1972 | Heers | 375/34 X |
| 4,387,364 | 6/1983 | Shirota | 375/19 |
| 4,531,153 | 7/1985 | Watanabe | 358/13 |
| 4,700,363 | 10/1987 | Tomlinson et al. | 375/57 |

FOREIGN PATENT DOCUMENTS 50-26167  8/1975  Japan .

Primary Examiner—Benedict V. Safourek
Attorney, Agent, or Firm—Sprung Horn Kramer & Woods

[57] ABSTRACT

A pulse code modulation process converts an analog video signal into a digital signal to be passed through a recording or transmission channel. The digital signal includes a digital words of a given number of bits, and each digital word represents an amplitude level of the video signal. The digital words are allocated to a given set of graduated amplitude levels such that the sum $$\sum_{k=0}^{k=2^m-1} \sum_{i=1}^{i=m} 10 \log_2 |A(i,k)|$$

has a minimum value
whereby
  i = the ordinal or place number of a bit within a digital word
  m = the number of bits of a digital word,
  k = the ordinal number of an amplitude level in the given set,
  A(i, k) = an amplitude error measured by the number of jumped-over amplitude levels caused by an erroneous reproduction or transmission of a single bit i in a digital word k.

6 Claims, 6 Drawing Sheets

FIG.3A

| | | | | | | | | |
|---|---|---|---|---|---|---|---|---|
| 93 | 1 | 1 | 0 | 0 | 0 | 0 | 1 | 1 |
| | 1 | 0 | 1 | 0 | 0 | 0 | 1 | 1 |
| | 1 | 0 | 0 | 1 | 0 | 0 | 1 | 1 |
| | 1 | 0 | 0 | 0 | 1 | 0 | 1 | 1 |
| | 1 | 0 | 0 | 0 | 0 | 1 | 1 | 1 |
| | 0 | 1 | 0 | 0 | 0 | 1 | 1 | 1 |
| | 0 | 1 | 0 | 0 | 1 | 0 | 1 | 1 |
| 100 | 0 | 1 | 0 | 1 | 0 | 0 | 1 | 1 |
| | 0 | 1 | 1 | 0 | 0 | 0 | 1 | 1 |
| | 0 | 0 | 1 | 0 | 0 | 1 | 1 | 1 |
| | 0 | 0 | 1 | 0 | 1 | 0 | 1 | 1 |
| | 0 | 0 | 1 | 1 | 0 | 0 | 1 | 1 |
| | 0 | 0 | 0 | 1 | 0 | 1 | 1 | 1 |
| | 0 | 0 | 0 | 1 | 1 | 0 | 1 | 1 |
| | 0 | 0 | 0 | 0 | 1 | 1 | 1 | 1 |
| | 0 | 0 | 0 | 1 | 1 | 1 | 0 | 1 |
| | 0 | 0 | 1 | 0 | 1 | 1 | 0 | 1 |
| 110 | 0 | 1 | 0 | 0 | 1 | 1 | 0 | 1 |
| | 1 | 0 | 0 | 0 | 1 | 1 | 0 | 1 |
| | 1 | 0 | 0 | 1 | 0 | 1 | 0 | 1 |
| | 0 | 1 | 0 | 1 | 0 | 1 | 0 | 1 |
| | 0 | 0 | 1 | 1 | 0 | 1 | 0 | 1 |
| | 0 | 1 | 1 | 0 | 0 | 1 | 0 | 1 |
| | 1 | 0 | 1 | 0 | 0 | 1 | 0 | 1 |
| | 1 | 1 | 0 | 0 | 0 | 1 | 0 | 1 |
| | 1 | 1 | 0 | 0 | 1 | 0 | 0 | 1 |
| | 1 | 0 | 1 | 0 | 1 | 0 | 0 | 1 |
| 120 | 1 | 0 | 0 | 1 | 1 | 0 | 0 | 1 |
| | 0 | 1 | 0 | 1 | 1 | 0 | 0 | 1 |
| | 0 | 1 | 1 | 0 | 1 | 0 | 0 | 1 |
| | 0 | 0 | 1 | 1 | 1 | 0 | 0 | 1 |
| | 0 | 1 | 1 | 1 | 0 | 0 | 0 | 1 |
| | 1 | 0 | 1 | 1 | 0 | 0 | 0 | 1 |
| | 1 | 1 | 0 | 1 | 0 | 0 | 0 | 1 |
| 127 | 1 | 1 | 1 | 0 | 0 | 0 | 0 | 1 |
| | • | • | • | • | • | • | • | • |
| | • | • | • | • | • | • | • | • |
| | • | • | • | • | • | • | • | • |
| | • | • | • | • | • | • | • | • |
| 255 | 1 | 1 | 1 | 1 | 1 | 1 | 1 | 1 |

FIG.3B

PULSE CODE MODULATION SYSTEM

CROSS-REFERENCE TO RELATED APPLICATION

This is a continuation-in-part of application Ser. No. 532,443, filed on Sep. 14, 1983, now abandoned.

BACKGROUND OF THE INVENTION

The present invention relates in general to a transmission or recording of pulse code modulated signals, and in particular it relates to a pulse code modulation system in which a digital signal is passed through a recording- or transmission-channel, whereby each binary word of the digital signal is being correlated to an amplitude value of an analog signal.

In the case of a magnetic recording, but also during the transmission of digitally coded analog signals, the digital information carried by the signal may become partially altered due to interferences such as noise signals, for example. As a measure of the false information there is used the so-called bit error rate, which indicates the ratio of disturbed or false bits to the correctly reproduced ones. Values of the bit error rates occuring in practice lie in the range between $10^{-4}$ and $10^{-7}$. While the bit error rate by itself depends on the quality of the particular recording- or transmission channel, the effects of bit errors on the analog signal to be reproduced are dependent also on the kind of code employed. Accordingly, codes are desirable with which single bit errors exhibit a minimum interference effect on the reconverted analog signal. As a part of the interference effect is also meant the disturbance in perception (or a perception error) by eye or ear of a viewer or listener caused by an amplitude error in the reconverted analog signal due to a bit error in the code. For instance, experiments and theoretical considerations have unambiguously shown that for a certain degree of distortion in perception of a TV picture (a perception error) produced on a viewer by an amplitude error in a TV signal, a substantially higher amount of single bit errors in code words assigned to smaller amplitude levels is permissible than the number of single bit errors in code words assigned to higher amplitude levels of the PCM signal. It has been proved experimentally that in binary coded signals the bit error ate can be increased by a perception error factor of 10 in the case of an interference in less significant bits to obtain the same interference effect as in the case of a more significant bit differing by a single binary place.

SUMMARY OF THE INVENTION

A general object of the present invention is to provide a pulse code modulation process for converting an analog video signal into a digital signal which is to be passed through a recording or transmission channel, and in which bit errors exhibit the least possible influence on the reconverted analog signal.

In keeping with this object, and others which will become apparent hereafter, one feature of the invention resides in the step of allocating to a given set of graduated amplitude levels digital words in such a way that the sum $$\sum_{k=0}^{k=2^m-1} \sum_{i=1}^{i=m} 10 \log_2 |A(i,k)|$$

has a minimum value whereby i = the ordinal number or place of a bit within a digital word m = the total number of bits cf a digital word, k = the ordinal number of an amplitude level in a given set of stepped amplitude levels, A(i,k) = an amplitude error measured by the number of jumped-over amplitude levels caused by an erroneous reproduction or transmission of a single bit i in a digital word k.

The pulse modulation process and system of this invention has the advantage that, at a given bit error rate of the digital signal, the reconverted analog signals produce a reduced interference effect or perception error in comparison with known binary codes.

The novel features which are considered as characteristic for the invention are set forth in particular in the appended claims. The invention itself, however, both as to its construction and its method of operation, together with additional objects and advantages thereof, will h = best understood from the following description of specific embodiments when read in connection with the accompanying drawings.

BRIEF DESCRIPTION OF THE DRAWING

FIGS. 3A and 3B show parts of a table of a digital signal including 8-bit words coded in accordance with this invention.

DESCRIPTION OF THE PREFERRED EMBODIMENTS

Figure 1:
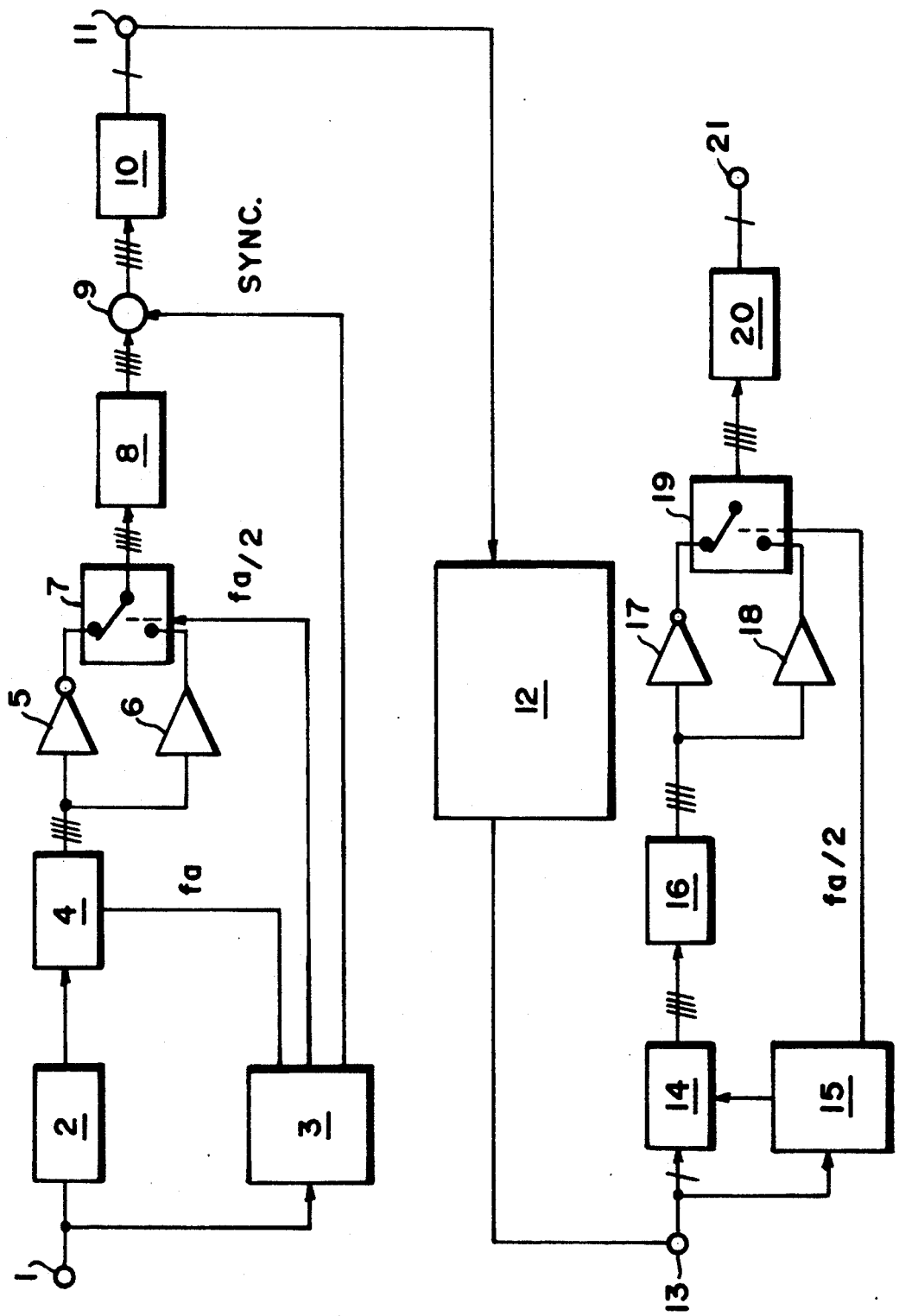
FIG. 1 is a block circuit diagram of a coding and decoding system applicable for the coding process of this invention.

FIG. 1 illustrates an exemplary embodiment of a pulse code modulation system applicable for the coding process according to this invention. An analog amplitude modulated video signal be recorded in a recording device 12 and is fed from an input terminal 1 via a low-pass filter 2 to an analog/digital converter 4, and is also branched from the terminal 1 to a clock generator 3. In the clock generator a synchronizing signal sync is separated from the video signal. From the synchronizing signal, a sampling or clock signal fa for the analog/digital converter 10 and other clock signals which will be described below are derived. The digital output signal from the analog/digital converter 4, consists of multi-bit binary words whose digital value for the lowest video amplitude level starts with 0000 and for the highest video amplitude level has binary digit value 1111. In order to obtain a sufficiently high resolution of amplitude levels of the video signal, an 8-bit digital word is most frequently used. Each second sample is inverted by means of elements 5, 6, 7. An output signal from clock generator 3 controls at half the sampling frequency fa/2 a switch 7 which, during one sampling period, is in its upper switching position to pass the digital signal through an inverter 5 to a code converter 8. During the other sampling period, the switch 7 is in its lower switching position and leads the digital signal from the output of the digital/analog converter 4 via a buffer 6 to the code converter 8. The inversion of video signals, which serves for the reduction of DC voltage components of the digital signal, is not essential for the coding process according to this invention.

The code converter 8 converts the binary-coded output signal of the analog/digital converter 4 into a digital signal which is coded with the code according to this invention.

It will be noted that switch 7 is indicated only schematically, and in the actual circuit it is implemented by suitable logical switching circuits. The code converter 8 preferably consists of a programmable read-only memory (PROM). An example of a code of this invention applied to a digital 8-bit word signal is illustrated in the code table of FIG. 3. The essence of this invention, however, will be first explained with reference to a 3-bit code, illustrated in FIG. 2.

Referring again to FIG. 1, adding circuit 9 receives at one input a clock signal from the clock generator 3 which corresponds to the synchronizing signal derived from the video signal. The other input of adder 9 is connected to the output of the code converter 8. The synchronized recoded digital signal from adder 9 is applied to a parallel/series converter 10 where it is converted to a series signal and is fed via terminal 11 to a recording device or transmission channel 12.

Examples of codes according to this invention will now be explained with reference to FIGS. 2 and 3. Since the novel codes are adjusted according to the quality of the transmission channel or recording device 12, they will hereinbelow be referred to as channel codes. In the present case, it is assumed that the quality of the transmission channel or recording device 12 is such that an interference affecting all individual bits is equally probable, but an interference affecting several bits in the respective words of the digital signal is very improbable. Before the explanation of the Tables shown in FIGS. 2 and 3, the relationship between a binary code and the introduced errors or interferences will be discussed.

In selecting a channel code its error-sensitivity is to be considered. In an 8-bit binary code, from the statistical point of view, 12.5% of all errors may be shared by any bit from the most significant bit MSB to the least significant bit LSB. For the purpose of transmitting or recording the carrier information in a channel which is subject to interferences, the binary data can be converted into a code which exhibits a reduced perception error or interference effect. It should be considered that errors in MSB produce substantially stronger distortion in the perception of the reconverted video signal than errors in the least significant bit LSB. That is, it is of advantage to employ a channel code in which the possible errors do not uniformly affect all bit places but in which the probable distribution of interference effects of amplitude errors is shifted to less significant bits of corresponding binary code words. In other words, in a channel code designed in accordance with this invention, bit errors are permitted which in an ordinary binary code would produce more interference even if the least significant bits be affected.

Figure 2A:
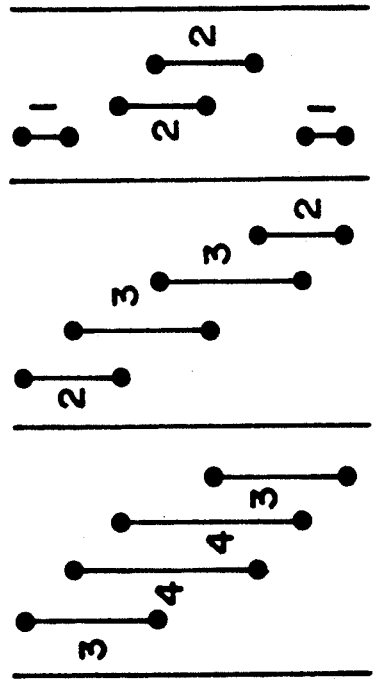
FIGS. 2A, 2B and 2C show examples of different applicable digital codes, including a code of this invention.
Figure 2B:
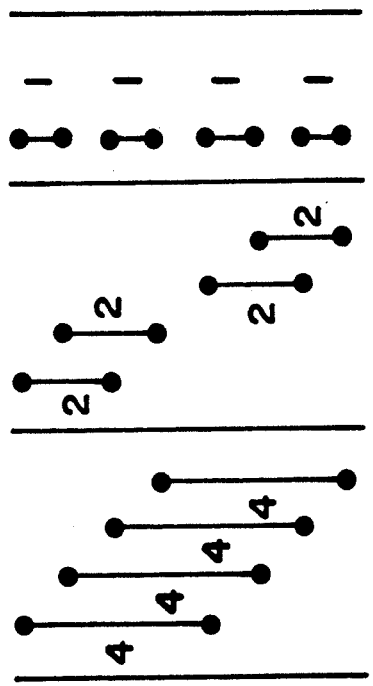
Figure 2C:
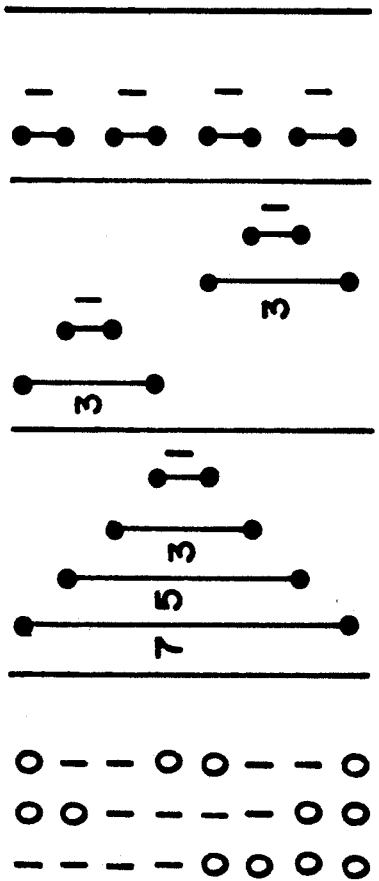

Referring to FIG. 2, the essence of this invention will now be explained by way of three different codes applied to 3-bit words. In FIG. 2b, an ordinary prior art binary code is shown produced by selection of different amplitude levels expressed in binary digits. FIG. 2a shows a code of this invention and FIG. 2c a table of the known Gray code. In the left-hand column of each Table, a set of eight graduated or stepped up amplitude levels k=0-7 is correlated to a set of three-place binary code words; the subsequent three columns illustrate the amplitude errors A(i,k) resulting from the misrepresentation of a single bit at a place in the respective binary code words; and the right hand column shows the computation of a total interference effect resulting from amplitude errors due to all possible single bit errors in the set of code words.

In the following explanations, the term "amplitude error" A(i,k) denotes a number of jumped-over amplitude levels caused by a single bit error at a place; in a code word; the term "amplitude error frequency" denotes the count of equal amplitude errors per a set of code words; the term "perception error factor" denotes an empirically determined distortion in perception of an amplitude error by a listener or viewer of a reconverted analog signal; and the term "interference effect" denotes the product of an amplitude level error frequency and a corresponding perception error factor.

For instance, if in the binary code of FIG. 2b a single bit is erroneous, that is, if in the first or most significant bit (MSB) place a logic "1" instead of a "0", or a "0" instead of a "1" is present, then a misrepresentation of the analog signal by four amplitude levels will result. Bit errors in the second bit place cause an amplitude jump over two levels, whereas the bit errors or changes in the third or least significant bit (LSB) place produce an amplitude jump by one amplitude level only. It will be recalled that according to the aforementioned experiments a doubling of the amplitude error results in a ten-times larger perception error factor or interference effect. Assuming that all possible bit errors occur at the same frequency, the following is valid for the computation of the interference effect of the ordinary binary code illustrated in FIG. 2b:

In the group or set of eight code words 111 to 000 gradually arrayed or stepped down according to amplitude levels 7 to 0, each single error in the least significant bit (LSB) places causes a jump over one amplitude level. Accordingly, a total amount of four one-amplitude-level jumps is possible in LSB places in the entire set of the code words.

The perception of one-level amplitude errors in the corresponding analog signals has been empirically evaluated or weighted by a perception error factor "1" and therefore, the total interference effect which is the product of the count of amplitude level jumps and the corresponding perception error factor, equals 4×1=4.

Single bit errors in the second bit of respective code words produce four two-amplitude-level jumps (perception error factor 10), resulting in an interference effect 4×10=40.

Single bit errors in the most significant bit (MSB) places produce four four-amplitude-level jumps (perception error factor=100) and the interference effect is 4×100=400. The sum of interference effects due to all possible combinations of single bit errors in the code words thus amounts to 444 which number represents a measure of susceptibility of the code to transmission errors.

In the code of this invention illustrated in the example of FIG. 2a, there occur only two jumps by four amplitude levels in the MSB places (the perception error factor=100 each). There are possible four amplitude jumps over three amplitude levels (evaluated by a factor 38 each), four amplitude jumps over two levels (factor 10 each) and two amplitude jumps over one level (factor 1 each). The total sum of the resulting interference effects is 392, which is clearly lower than in the case of an ordinary binary code of FIG. 2b. For comparison, the interference effects of the conventional Gray code are shown in FIG. 2c. In the latter code, a misrepresentation of the most significant bit in the first digital word causes an amplitude error by seven levels, and consequently the computation of the interference effect indicates that the total sum (=973) of interfering effects of the Gray code is the largest one.

Still larger improvements due to the code of this invention are achieved with digital words having larger numbers of places, such as an 8-bit word which is frequently used in television technology.

Figure 3A:
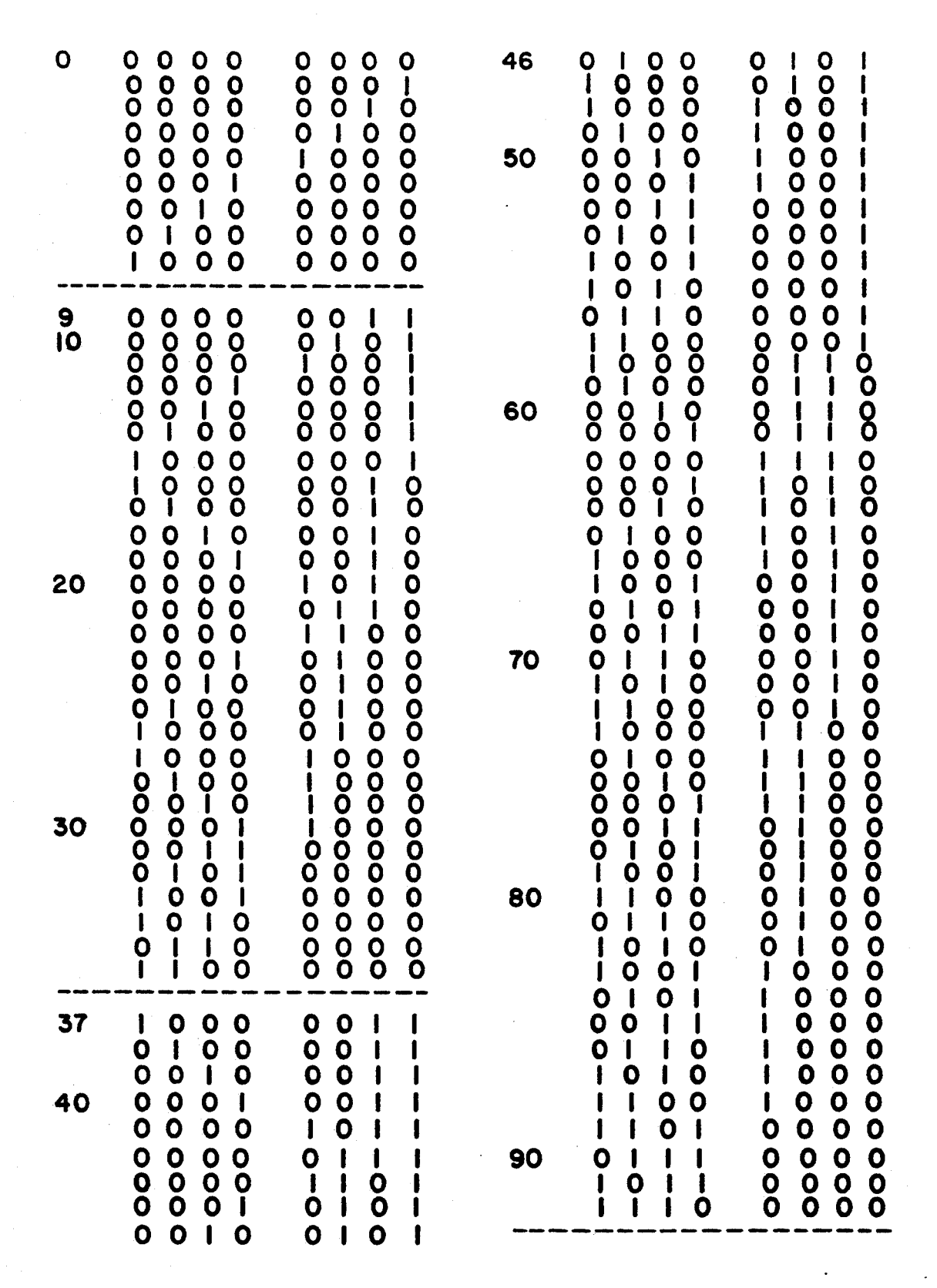

In the code table illustrated in FIG. 3, the left column indicates amplitude levels in decimal numbers, whereas the right column shows the correlated words of the digital signal code according to this invention for application in a transmission or recording channel. The lowest amplitude level, that is level 0, is assigned to the coded signal represented by eight zero's. Up to the amplitude level 8, the digital words include at different places only a single logic "1" bit. Up to the amplitude level 36, there are two logic "1" bits in each 8-place digital word. At still higher amplitude levels, the proportion of logic "1" bits relative to the "0" bits keeps increasing. For the sake of simplicity, the table is shown only up to amplitude level 127, because at still higher levels the proportion changes symmetrically, so that at to the amplitude level 255 a digital word with eight 1's is present.

An error in one bit in the code word for the amplitude level 0 produces an amplitude error reading at most of eight amplitude levels. In general, a bit error is most observable when, instead of a correct amplitude value, a value from a group of adjoining amplitudes of the signal is transmitted or reproduced. A group of adjoining amplitudes is meant the successive amplitude levels each of which is represented by a digital word having the same amount of logic zeroes or logic "1"'s. For example, the group having a single "1" and seven "0" bits covers eight amplitude levels, whereas the group of digital words each having four logic "1" and four bits covers seventy amplitude levels (of which only 35 are illustrated in FIG. 3). From these examples, it is evident how the sensitivity to interference can be reduced by selecting proper codes. Even if the possibility of a relatively large amplitude misrepresentation still exists due to a single bit error, such situation occurs less frequently than in the case of an ordinary binary code. For instance, without additional precautions it is still quite possible that a word coded according to this invention and lying at the upper end of the group having four logic "1" and four logic "0" bits an amplitude change is misrepresented by a single bit error to such an extent that it corresponds to a coded word at the lower end of the group (having three logic "1" bits). The resulting amplitude error in this case would amount to 123 amplitude levels. For this reason, the code words in the individual groups are arranged in such a manner that a code word situated at one end of a group may in the case of a single bit error be changed into a code word which at most corresponds to a word at the corresponding end of the adjoining group. The first or lowest code word, having three logic "1" bits for example and assigned to the amplitude level 37, can by an alternation of a "0" into a logic "1" become a code word for the amplitude levels 93–97, that is it belongs to the first or lower amplitude level in the group with four "1" bits.

Figure 4:
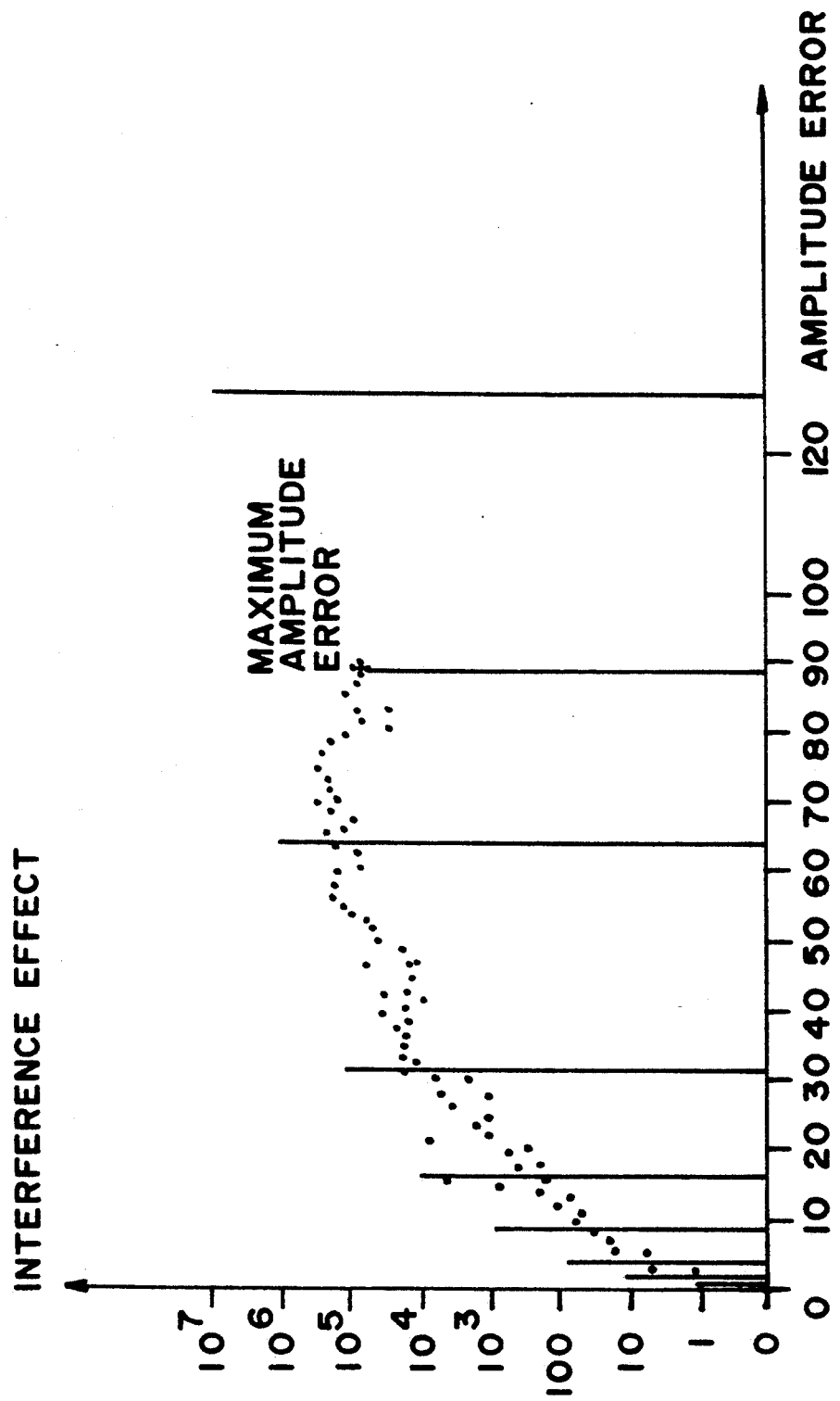
FIG. 4 is a plot diagram of amplitude errors versus the magnitudes of the interference effect caused by the amplitude errors.

The code of this invention (FIGS. 2a and 3) is assembled with regard to the probability of distribution of interference effects of amplitude errors as illustrated by dots in the plot of FIG. 4. As mentioned before, the term "interference effect" denotes the product of an amplitude error and a probable (empirically weighted) perception error factor. The abscissa in FIG. 4 indicates amplitude error values and the ordinate interference effect values.

In the case of an ordinary prior art binary code, a misrepresentation of a single bit in one 8-bit word can produce amplitude errors 1, 2, 4, 8, 16, 32, 64 and 128, as indicated in FIG. 4 by perpendicular full lines. Due to the large differences in interference effect values the diagram is plotted according to a logarithmic scale. It will be seen that, for example, an error of 64 jumped-over amplitude levels disturbs ten times less ($10^6$) than an error of 128 jumped-over amplitude levels ($10^7$). However, the largest interference effect of amplitude errors which may occur in the code of this invention (FIG. 3) corresponds to that of 88 jumped-over amplitude levels as indicated by the dot line in FIG. 4. Consequently, the sum of interference effects of all possible amplitude errors in a given set of code words of this invention is smaller than in the case of an ordinary binary code. It can be proved that the improvement in the interference sensitivity is about 6 decibels.

The process or the system of this invention is not limited to the described examples of pulse coded signals. It can be used for still shorter or longer binary words of the digital signal. In the example which has been described in connection with FIGS. 1 and 3, an increasing proportion of logic "1" bits in the consecutive words has been assumed. This embodiment represents a combination including the subject matter of U.S. Pat. No. 4,491,869. In the latter patent, a system is described in which, in order to obtain a better spectral distribution of the digital signals during the recording of video signals, each second picture point is inverted and in addition the number of logic "1" bits is made approximately proportional to the video amplitude. The present invention is, however, applicable even without the characteristic features of the aforementioned U.S. Pat. No. 4,491,869, for instance the inverting stage in the circuit of FIG. 1 can be dispensed with. Also, it is not necessary to start from the lowest data word (00000000). For the amplitude stage 0, for instance, an arbitrary binary word can be employed. It is only necessary that all amplitude changes be correlated with this reference data word in the manner as described before. The relation between the code words for the amplitude levels 1–8 to the code word for the amplitude level 0 could therefore be expressed in the following general form: Starting from the code word for the amplitude level 0, the code word for the amplitude levels 1–8 are determined such that always a bit position is changed. If this bit position for the code word pertaining to the amplitude level 0 is a logic "0", then it is changed to logic "1", or if in the code word for the amplitude level 0 is a logic "1", it is changed to a logic "0".

In the aforediscussed examples, there is no difference between a bit error resulting from the change of a logic "1" into a logic "0", and vice versa; it is therefore possible to invert all digits in the signal of FIG. 3, and the resulting inverted code has the same measure of interference effects as the code illustrated in FIG. 3.

After passage through the recording or transferring channel, the series digital signal is applied to terminal 13 (FIG. 1) to a series/parallel converter 14 and to a clock generator 15 whose output synchronizes the series/parallel conversion. The output signal from the converter 14 is applied to a code converter 16, whose function is opposite to the function of code converter 18, that is, at its output an ordinary binary coded signal is produced. The binary signal is again inverted by circuits 17, 18, 19 according to the scanning period, so as to neutralize the inversion in the preceding circuits 5, 6, 7. To this end, switching circuit 19 is controlled by a control signal from the clock generator 15 at a frequency $f_a/2$ corresponding to half the sampling frequency.

Finally, by means of a digital/analog converter 20, the analog video signal is restored and applied to output terminal 21 for further processing.

It will be understood that each of the elements described above, or two or more together, may also find a useful application in other types of constructions differing from the types described above.

While the invention has been illustrated and described as embodied in specific examples, of the pulse code modulating system for use with a transmission or recording channel for video signals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A pulse code modulation process for converting an analog video signal into a digital signal which is to be passed through a recording or transmission channel, said digital signal including digital words of a given number of bits, wherein each different digital word represents a different amplitude level of the video signal, the process comprising the sep of allocating the digital words to a given set of graduated amplitude levels in such a way that (1) starting from an end of the given set of amplitude levels of the video signal, coded binary words are generated in which a number n of bits has been changed from the bits in the binary word representing said one end, wherein all binary words with n=1 for amplitude levels close to said one end form a first group of binary words, then forming additional groups of coded binary words starting from n=2 up to a group of n=the total number of bits in a binary word minus one, whereby a binary word in which all bits have been changed is formed for the other end of said given set of amplitude levels, and (2) the sum $$\sum_{k=0}^{k=2^m-1} \sum_{i=1}^{i=m} 10 \log_2 A(i,k)$$

has a substantially minimum value
whereby
i = the ordinal number of a bit within a digital word
m = the number of bits of a digital word,
k = the ordinal number of an amplitude level in the given set,
A(i,k) = an amplitude error measured by the number of jumped-over amplitude levels caused by an erroneous reproduction or transmission of a single bit i in a digital word k.

2. A pulse code modulation process as defined in claim 1, wherein the code words in said groups are generated in such a manner that from code words of one group, by considering a possible bit error, code words of the next group are derived, said code words of the next group differing from one another as little as possible.

3. A pulse code modulation process as defined in claim 2, wherein the code word for the one end of the given set of amplitude levels is composed of logic "0" bits and the code word for the opposite end of the set is composed of logic "1" bits, and the intermediate groups of code words, which include equal numbers of logic "1" bits, are coded from one intermediate group to the next intermediate group so that the number of logic "1" bits increments by one.

4. A pulse code modulation process as defined in claim 1, wherein the binary words in said groups are generated in such a manner that from binary words of one group, by considering a possible bit error, binary words of the next group are derived, said binary words of the next group differing from one another as little as possible.

5. A pulse code modulation process as defined in claim 4, wherein the binary word for the one end of the set of amplitude levels is composed of logic "0" bits and the given binary word for the opposite end of the set is composed of logic "1" bits, and the intermediate groups of binary words, which include equal numbers of logic "1" bits, are coded from one intermediate group to the next intermediate group so that the number of logic "1" bits increments by one.

6. A pulse code modulation process as defined in claim 1, wherein, when all possible amplitude errors generated by single bit errors are added together, the bit errors are evaluated in accordance with their interference by powers of 10.

* * * * *